United States Patent [19]

Chartet

[11] 4,044,443
[45] Aug. 30, 1977

[54] METHOD FOR ASSEMBLING TUBES AND TUBE PLATES AND PRODUCT RESULTING THEREFROM

[75] Inventor: André Chartet, Meudon, France

[73] Assignee: Societe Anonyme des Usines Chausson

[21] Appl. No.: 572,450

[22] Filed: Apr. 28, 1975

[30] Foreign Application Priority Data

May 30, 1974 France .................................. 74.18840

[51] Int. Cl.² ............................................. B23P 15/26
[52] U.S. Cl. ...................................... 29/157.4; 29/432; 165/173; 285/192
[58] Field of Search ............ 29/157.4, 157.5, 157.3 C, 29/157 R, 432, 450; 165/173, 175; 285/162, 192, 200

[56] References Cited

U.S. PATENT DOCUMENTS

| 2,160,374 | 5/1939 | Veillette | 29/432 |
| 3,510,929 | 5/1970 | Kilmarx | 29/157 R |
| 3,583,478 | 6/1971 | Fieni | 165/175 |
| 3,706,292 | 12/1972 | Saunders | 113/1 G |
| 3,710,473 | 1/1973 | McElwain et al. | 29/157.4 |
| 3,726,244 | 4/1973 | Arangelovich et al. | 113/7 A |
| 3,940,837 | 3/1976 | Wiese | 29/157.5 |

FOREIGN PATENT DOCUMENTS

| 1,363,471 | 8/1974 | United Kingdom | 285/162 |

Primary Examiner—C.W. Lanham
Assistant Examiner—Daniel C. Crane
Attorney, Agent, or Firm—Browdy and Neimark

[57] ABSTRACT

Tube passages slightly bigger than the tubes are formed in a plate. A soft resilient sheet is placed on one side of the plate. The tube is forcibly inserted in the tube passages and draws a portion of the sheet which is then cut. In the assembly of the sheet, which has a bigger thickness than the interval between the tube and the tube passage, forms a flange beyond the tube plate.

7 Claims, 12 Drawing Figures

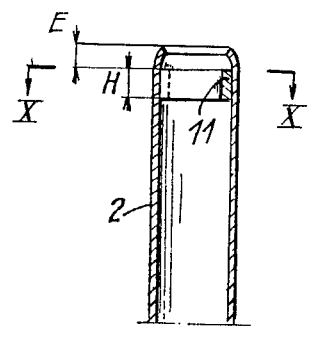
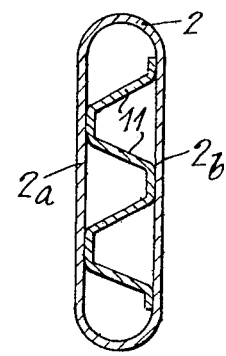
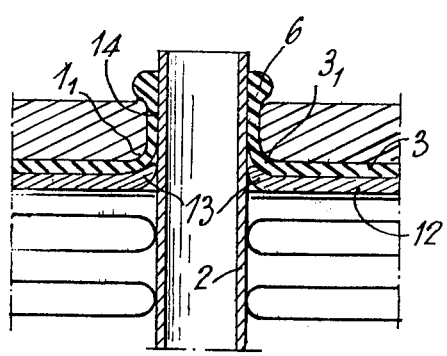
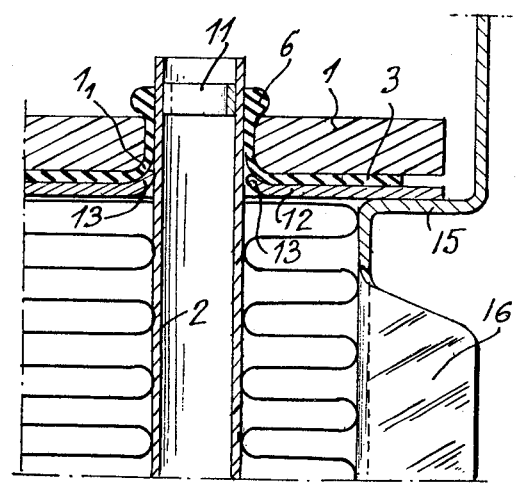

METHOD FOR ASSEMBLING TUBES AND TUBE PLATES AND PRODUCT RESULTING THEREFROM

The present invention relates to a new method for tightly assemblying tubes in tube passages provided in a plate and by means of flexible joints.

This invention relates more particularly to heat exchangers having a core comprising by metallic tubes which are circular, oblong or rectangular in shape, and to which are fixed secondary heat exchange elements or fins typically by brazing, soldering, crimping, glueing, etc...

In these apparatuses, the main manufacturing problems, and later the operating incidents, lie in the large number of connections which necessarily exist between the tubes of the core and the end plates in which they terminate; in many cases, these connections are realized through soft soldering or brazing between the tubes and the end plates, and the mechanical strength of such connections is often poor. Especially, when the end plates have a tendency to move in relation to the tubes, which happens due to changes in pressure and temperature to which these parts are submitted and also due to mechanical vibrations, it then happens that the connections between the tubes and the end plates are damaged thus causing leaks.

In the art of heat exchangers, it has already been offered to realize the tube-end plate connections by means of resilient joints, but it was then necessary, up to now, to design said joints in a relatively complex shape to be adapted as well to the end plates as to the tubes, and it was required in most of the cases to inflate or swell the tubes to distort the soft joints out of shape, which constitutes a delicate operation in mass production manufacturing.

The present invention applied to heat exchangers provides such a tight connection which is particularly efficient and which, besides, remains flexible thereby eliminating the effects due to changes in pressure and to differential expansions between the various parts of the heat exchangers.

According to the invention, the method for assembling tube in a tube plate comprises the steps of
forming tube passage in said plate, and tube passage having a shape corresponding to that of the tube and a size slightly bigger than that of said tube;
placing, on one side of the tube plate, a flexible resilient sheet of a substantially uniform thickness;
forcibly inserting the tube into the tube passage of the tube plate through drape-covering the end portion of said tube by said resitient sheet whereby a portion of the resilient sheet covers the end portion of the tube and is squeezed inside tube passage; and
cutting said sheet on top of said tube, whereby the inner stress of the material constituting said resilient sheet contracts the portion of said sheet extending beyond the tube plate while forming a stressed flange pressing the tube wall and bearing on said tube plate.

Various other features of the invention are shown in the following detailed description.

Embodiments of the invention are shown by way of non-restrictive examples in the accompanying drawings in which:

FIG. 9 is a sectional view showing a development of this invention.

FIG. 10 is a sectional view taking along line X—X of FIG. 9.

FIGS. 11 and 12 are sectional views similar to FIG. 5 showing two other developments of this invention.

Figure 1:
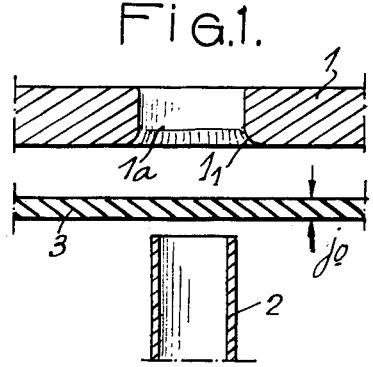
FIG. 1 is an exploded diagrammatic sectional view showing the main constituting elements of this invention.

In the drawings, 1 designates a tube plate in which must be tightly positioned a tube 2. The tube plate 1 can be constituted by an end plate of a heat exchanger of which the tube 2 is one of the circulation tubes.

For the assembling of the tube plate 1 and of the tube or tubes 2, there is provided that the inner size of the tube passages 1a in the plate 1 be slightly of a bigger diameter than that of the outer wall of the tube or tubes 2 which can as well have a circular section, an oblong section or a practically rectangular section of which the smaller sides are neverthless preferably rounded. Between the plate 1 and the top of the tubes 2 there is placed a continuous sheet 3 made of resilient material, typically rubber.

Figure 2:
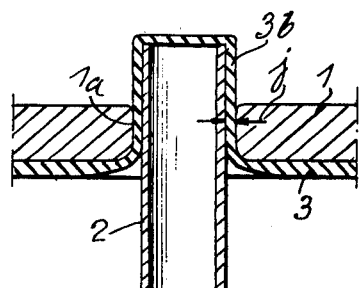
FIG. 2 is the view of FIG. 1 after performance of a first assembling step.

A second operation consists, as shown in FIG. 2 to force the tube or tubes 2 into the tube passages 1a, which has for its effect to drape-cover the portions of the sheet 3 driven by the tubes 2 on the end of the tubes while distorting the sheet 3 between the wall of the tube passage 1 and the outer wall of each tube 2. It can be seen in FIGS. 1 and 2 that the resulting thickness $j$ of the sheet 3 pressed between the wall 1a and the corresponding wall of the tube is substantially thinner than thickness $j_o$ of the sheet 3 before being distorted.

Figure 3:
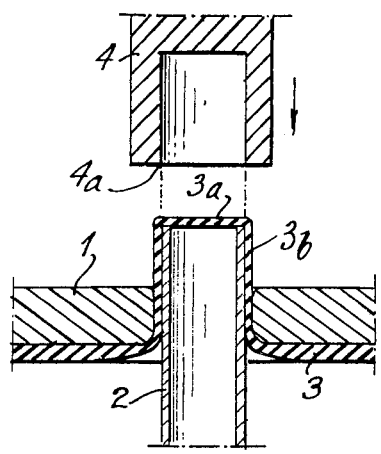
FIGS. 3 and 4 are sectional views showing performance of an additional step.

A next manufacturing step consists, as shown in FIG. 3, to cut away the portion 3a of the sheet 3 which covers the top of each tube 2. This cutting is made for example with a tool 4 shaped like a die of which the cutting edge 4a cooperates with the outer peripheral edge of the tube 2 then acting as a punch. The cutting tool can also be constituted by a punch 5 as shown in FIG. 4 and, in that case, the working edge 5a of that tool cooperates with the inner peripheral edge of the tube 2 which then acts as a die instead of working as a punch in the case previously illustrated in FIG. 4.

Figure 4:
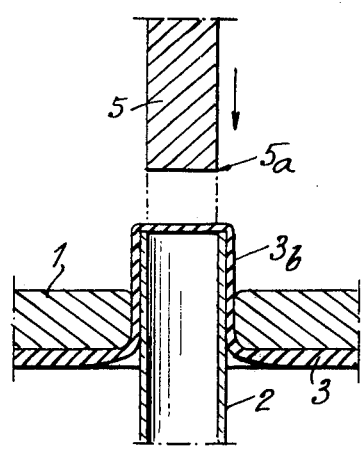
Figure 5:
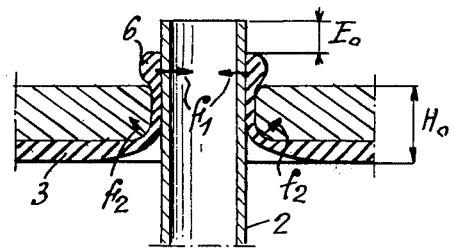
FIG. 5 is a sectional view showing a finished assembly.

FIGS. 2 – 4 show that the tube 2 must be inserted into the tubular plate 1 to protrude substantially above said plate. Thus, as soon as the cutting operation in the sheet 3 is performed, the portion 3b of said sheet which covers the lateral wall of the tube contracts and forms a flange 6 as shown in FIG. 5.

Under effect of a residual inner stress, the flange 6 is tightened with force against the tube and also on the top of the tube plate 1 and also against the bottom of said tube plate as shown, on one hand by arrows $f_1$ and, on the other hand by arrows $f_2$.

It is advantageous that the lower end of the tube passages 1a be slightly rounded as shown in $1_1$ (FIG. 1). This rounding facilitates sliding of the sheet 3 during insertion of each tube 2 and prevents the material of said sheet to from supporting an exaggerated length extension.

In the above described embodiment, which is represented in FIGS. 1 – 5, the tube plate 1 is shown as thick and can, for example, be made of molded material, particularly of synthetic resin, glass or metal.

Figure 6:
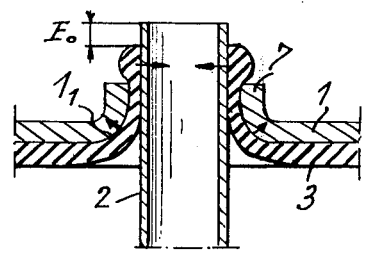
FIG. 6 is a sectional view similar of FIG. 5 of a variant.

This invention can be embodied in a similar way when the end plate 1 is made of metal which has been cut or stamped as this is frequently the case for end plates of heat exchangers. In that case, to delimit the tube passages 1a continuous collars 7 are formed, in a well known way, which shows represented in FIG. 6 which whows that there is obtained automatically the rounded shape $1_1$ against which slides the sheet 3 during insertion of each tube 1.

Figure 7:
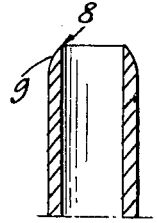
FIGS. 7 and 8 are sectional views showing a development of this invention for two particular types of tubes.
Figure 8:
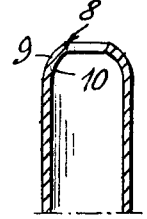

If desired, the cutting-away tools described in reference to FIGS. 3 and 4 can be avoided. In that case, the end of the tubes are shaped to define a sharp edge 8 followed by a ramp 9 enabling the sheet 3 to slide along the walls of the tube to form the flange 6 (FIG. 7). When the wall of the tube is very thin whereby it would be then difficult to form the ramp 9, it is possible, as shown in FIG. 8 to reduce the diameter of the tube at its end as shown in 10, thus the ramp 9 is then automatically formed.

When the tubes are of an oblong section or, close to a rectangle, the pressure exerted by the flange 6 could distort the larger sides of this tube and, in that case, as shown in FIGS. 9 and 10, it is advantageous to place in the tubes a reinforcing piece or stiffener 11 which is advantageously shaped as a corrugated fin, which causes the large sides 2a, 2b of the tube to be prefectly cross-braced.

The position of the reinforcing piece is preferably selected for its top to be at a distance E from the end of the tube as shown in FIG. 9, this distance E being smaller or equal to the distance $E_o$ (FIG. 5), i.e. to the distance of which the tube protrudes above the flange 6. The height H (FIG. 9) of the reinforcing piece 11 must, on the other hand, be equal or higher than the distance $H_o$ (FIG. 5), i.e. the height of the segment of tube against which is more or less applied the joint formed by the sheet 3.

In all embodiments of the present invention, and in order to prevent any sliding of the portion of sheet 3 which forms a sleeve 14 between the tube plate 1 and the tube wall, it is advantageous, in some cases, to slightly roughen the outer surface of the tube at least on the length H. It is also possible, as shown in FIG. 11 to fix onto the tube 2 a counter-plate 12 which, in the case of a heat exchanger, has the aspect of a false end-plate which can be soldered, brazed or glued to the tubes 2, without the requirement of any tightness between said latter plate and the tubes. Preferably, the plate 12 forms an upwards flange 13 tending to pinch the portion $3_1$ of the sheet 3 which is applied against the rounded portion $1_1$. There is thus prevented any back sliding of the sleeve 14 that said sheet $3_1$ delimits around each tube.

FIG. 12 shows another development of the description made above in reference to FIG. 11 and shows the application to a heat exchanger which comprises the counter-plate 12 held at its ends on a shoulder 15 formed by a lateral plate 16. In this embodiment, the counter-plate 12 is not necessarily soldered, brazed or glued to the tubes 2.

The invention is not restricted to the embodiments shown and described in detail, for various modifications thereof can moreover be applied thereto without departing from the scope of the invention, as shown in the appended claims. Particularly, the reinforcing piece 11 can be constituted by a corrugated fin extending the whole height of the tubes 2.

I claim:

1. A method of assembling at least one tube having an outer wall in a tube plate comprising the steps of:
    forming at least one tube passage in said plate, said tube passage having a shape corresponding to that of said tube and a cross-section slightly greater than that of said tube;
    placing a flexible, resilient sheet of substantially uniform thickness on one side of and in a planar coextensive relationship with said tube plate;
    bringing an end of said tube into contact with said flexible, resilient sheet;
    forcibly inserting said tube while in contact with said flexible, resilient sheet into said tube passage of said tube plate and beyond, a portion of said flexible, resilient sheet thus covering an end portion of said tube which extends beyond said plate; and
    cutting said portion of said sheet, whereby the inner stress of the material constituting said sheet restricts said portion of said sheet extending beyond said tube plate while forming a stressed flange pressing said outer wall of said tube and bearing on said tube plate.

2. A method as set forth in claim 1, wherein said sheet when unstressed has a thickness greater than the distance separating said outer wall of said tube from the inner wall of said tube passage formed in said tube plate.

3. A method as set forth in claim 1, wherein said tube passage formed in the tube plate is enlarged in its inlet portion from which said sheet made of flexible resilient material and said end portion of said tube are inserted to facilitate sliding of said sheet into said tube plate.

4. A method as set forth in claim 1, wherein said portion of said flexible, resilient sheet covering said and portion of said tube is cut away by means of a die cooperating with said tube acting as a punch.

5. A method as set forth in claim 1, wherein said portion of said flexible, resilient sheet covering said end portion of said tube is cut away by means of a punch cooperating with that end of said tube which extends beyond said plate working as a die.

6. A method as set forth in claim 1, wherein a sharp edge is formed at that end of said tube which extends beyond said plate, said sharp edge being followed by a ramp whereby cutting of said flexible, resilient sheet is ensured by said edge upon end of the insertion of said tube into said tube plate and beyond.

7. A method as set forth in claim 6, wherein said sharp endge is formed at said end of a reduced diameter portion of said tube.

* * * * *

UNITED STATES PATENT AND TRADEMARK OFFICE
CERTIFICATE OF CORRECTION

PATENT NO. : 4,044,443
DATED : August 30, 1977
INVENTOR(S) : CHARTET

It is certified that error appears in the above-identified patent and that said Letters Patent are hereby corrected as shown below:

Column 3, line 2, delete "to"

Column 3, line 13, "shows" should read --is--

Column 3, line 33, "prefectly" should read --perfectly--

Column 4, line 46, "and" should read --end--

Column 4, line 60, "endge" should read --edge--

Signed and Sealed this

Twenty-first Day of November 1978

[SEAL]

Attest:

RUTH C. MASON
Attesting Officer

DONALD W. BANNER
Commissioner of Patents and Trademarks